US007215516B2

(12) United States Patent
Yoshikawa et al.

(10) Patent No.: US 7,215,516 B2
(45) Date of Patent: May 8, 2007

(54) MAGNETORESISTIVE HEAD HAVING MAGNETORESISTIVE FILM INCLUDING FREE LAYER AND PINNED LAYER ARRANGED IN HEAD HEIGHT DIRECTION

(75) Inventors: Masatoshi Yoshikawa, Yokohama (JP); Masayuki Takagishi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 484 days.

(21) Appl. No.: 10/786,100

(22) Filed: Feb. 26, 2004

(65) Prior Publication Data

US 2004/0201930 A1    Oct. 14, 2004

(30) Foreign Application Priority Data

Feb. 26, 2003  (JP)  ............... 2003-048516

(51) Int. Cl.
   *G11B 5/39*  (2006.01)
(52) U.S. Cl. ............... 360/324.11; 360/324.12
(58) Field of Classification Search ... 360/324.1–324.2
   See application file for complete search history.

(56) References Cited

U.S. PATENT DOCUMENTS

| 5,905,611 | A | 5/1999 | Yoda et al. |
| 6,046,891 | A | 4/2000 | Yoda et al. |
| 6,172,858 | B1 | 1/2001 | Yoda et al. |
| 6,603,642 | B1 * | 8/2003 | Araki et al. ............... 360/324 |

FOREIGN PATENT DOCUMENTS

| CN | 1161531 A | 10/1997 |
| CN | 1352790 A | 6/2002 |
| JP | 6-325329 | 11/1994 |
| JP | 10-55512 | 2/1998 |
| JP | 10-255231 | 9/1998 |
| JP | 2000-293823 | 10/2000 |
| JP | 2000-339636 | 12/2000 |

OTHER PUBLICATIONS

Korean Patent Office Action, entitled "Notification for Filing Opinion," mailed by the Korean Patent Office on Nov. 23, 2005 in counterpart Korean Application No. 10-2004-0012440.
Office Action, entitled "Notification of the First Office Action," mailed by the Chinese Patent Office on Feb. 10, 2006 for counterpart Chinese Application No. 200410006735.1.

* cited by examiner

*Primary Examiner*—A. J. Heinz
(74) *Attorney, Agent, or Firm*—Finnegan, Henderson, Farabow, Garrett & Dunner, L.L.P.

(57) ABSTRACT

A magnetoresistive head includes a first magnetic shield, a first insulating film, a magnetoresistive film, a second insulating film and a second magnetic shield arranged in a track direction. The magnetoresistive film includes a magnetization free layer adjacent to an air-bearing surface, a magnetization pinned layer spaced apart from the magnetization free layer in a head height direction as viewed from the air-bearing surface, and a nonmagnetic intermediate layer connecting the magnetization free layer and the magnetization pinned layer, a magnetization direction of the magnetization free layer being rotatable in an external magnetic field and a magnetization direction of the magnetization pinned layer being substantially pinned under the external magnetic field.

18 Claims, 9 Drawing Sheets

MAGNETORESISTIVE HEAD HAVING MAGNETORESISTIVE FILM INCLUDING FREE LAYER AND PINNED LAYER ARRANGED IN HEAD HEIGHT DIRECTION

CROSS-REFERENCE TO RELATED APPLICATIONS

This application is based upon and claims the benefit of priority from prior Japanese Patent Application No. 2003-48516, filed Feb. 26, 2003, the entire contents of which are incorporated herein by reference.

BACKGROUND OF THE INVENTION

1. Field of the Invention

The present invention relates to a magnetoresistive head using a spin-valve element and a magnetic recording-reproducing apparatus having the magnetoresistive head installed therein.

2. Description of the Related Art

In recent years, recording density is being improved in the magnetic recording-reproducing apparatus such as an HDD. As a result of improvement in the recording density, the size of a recording bit that is a recording unit in a recording medium is reduced, and a signal magnetic flux generated from the recording medium is also made lower. Under the circumstances, a high-sensitive magnetoresistive head (MR head), which directly senses the medium magnetic flux by utilizing a magnetoresistive effect, has been put to the practical use.

Nowadays, a spin-valve element (SV-GMR) comprising a spin-valve (SV) film including a magnetization pinned layer (pinned layer)/an intermediate layer (spacer layer)/a magnetization free layer (free layer) and generating a giant magnetoresistive effect is used as a sensor element of the MR head.

The conventional SV-GMR head is a shielded SV head comprising an SV element and a pair of magnetic shields having the SV element sandwiched with interposing a pair of magnetic gaps and the SV element is a so-called CIP (Current-In-Plane)-SV element in which a sense current is made to flow in the in-plane direction parallel to the surface of the SV film.

Recently, a so-called CPP (Current-Perpendicular-to-Plane)-SV element, in which the sense current is made to flow in the perpendicular direction to the surface of the SV film, is proposed. Since the CPP-SV element shows improved magnetoresistance ratio (MR ratio), it can be expected that a GMR head having a high output will be realized.

Where further improvement in the recording density of the recording medium is attempted, it is required to reduce the track width and the bit length. However, since it is necessary to form a CIP-SV element or a CPP-SV element between the magnetic shields in the shielded SV head, a reduction in the distance between the shields and a reduction in the gap length are limited so as to make it difficult to comply with the requirement for the reduction in the bit length.

For example, Japanese Patent Disclosure (Kokai) No. 6-325329 teaches a structure that a magnetic underlayer for sensing an external magnetic field is formed to extend from the air-bearing surface in the height direction of the head and the magnetic underlayer is coupled with a magnetization free layer formed on an inner part remote from the air-bearing surface. In this structure, a nonmagnetic intermediate layer and a magnetization pinned layer are formed on the magnetization free layer, and the magnetic underlayer alone is formed near the air-bearing surface.

As described above, the reduction in the gap length is limited in the shielded GMR head and, thus, it is difficult to comply with the requirement for the reduction in the bit length in the magnetic recording-reproducing apparatus.

BRIEF SUMMARY OF THE INVENTION

An object of the present invention is to provide a magnetoresistive head capable of reducing the gap length and the track width and capable of suppressing undesired magnetic coupling between magnetic layers, and to provide a magnetic recording-reproducing apparatus having the particular magnetoresistive head installed therein.

A magnetoresistive head according to an aspect of the present invention comprises: a first magnetic shield; a first insulating film formed on the first magnetic shield; a magnetoresistive film formed on the first insulating film and comprising a magnetization free layer adjacent to an air-bearing surface, a magnetization pinned layer apart from the magnetization free layer in a head height direction as viewed from the air-bearing surface, and a nonmagnetic intermediate layer connecting the magnetization free layer and the magnetization pinned layer, a magnetization direction of the magnetization free layer being rotatable in an external magnetic field and a magnetization direction of the magnetization pinned layer being substantially pinned under the external magnetic field; a second insulating film formed on the first magnetoresistive film, and a second magnetic shield formed on the second insulating film.

DETAILED DESCRIPTION OF THE INVENTION

Figure 1A:
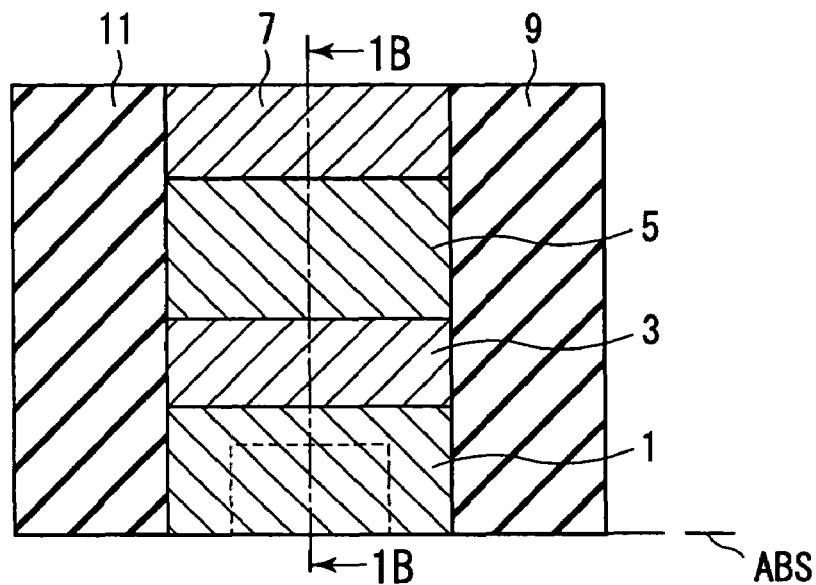
FIG. 1A is a cross-sectional view of a GMR head according to a first embodiment of the present invention in a direction parallel to the track width direction.

Embodiments of the present invention will now be described with reference to the accompanying drawings. Incidentally, the same reference numerals are put to the members that are common throughout the embodiments described herein so as to omit duplicated description. Also, the accompanying drawings are schematic drawings intended to facilitate the description and understanding of the present invention. Although the shape, size, ratio, etc., of each of the members of the element may differ from those of the actual element, the design of the element can be changed appropriately in view of the following description and the known technology.

First Embodiment

Figure 1B:
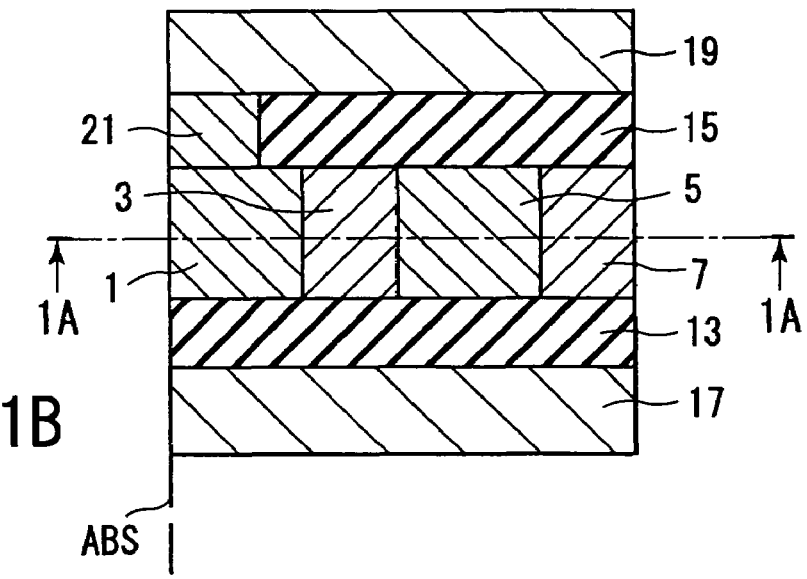
FIG. 1B is a cross-sectional view of the GMR head in a direction parallel to the track direction.
Figure 1C:
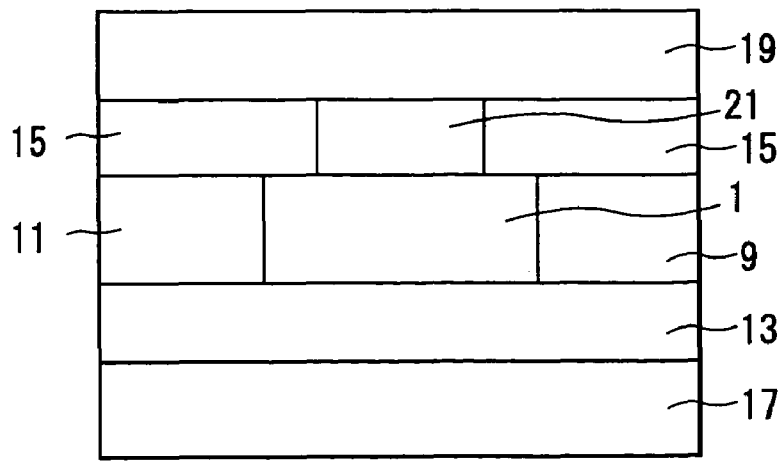
FIG. 1C is a plan view of the GMR head as viewed from the air-bearing surface.

A shielded GMR head according to a first embodiment of the present invention will now be described. FIGS. 1A to 1C show the construction of a shielded GMR head according to the present embodiment, wherein FIG. 1A is a cross-sectional view of the GMR head sectioned in a direction parallel to the track width direction of a magnetic recording medium (not shown), FIG. 1B is a cross-sectional view of the GMR head sectioned in a direction parallel to the track direction of the magnetic recording medium (not shown), and FIG. 1C is a plan view showing the GMR head as viewed from the air-bearing surface (ABS). FIG. 1A is a cross-sectional view along the line 1A—1A shown in FIG. 1B. The surface on the lower side of the drawing denotes the ABS. FIG. 1B is a cross-sectional view along the line 1B—1B shown in FIG. 1A. The surface on the left side of the drawing denotes the ABS.

The GMR head according to the present embodiment comprises an insulating nonmagnetic film surrounding the members referred to above and wiring for connecting the electrode of an SV element to a sensing circuit in addition to the members shown in FIGS. 1A to 1C. Also, a protective layer may be formed appropriately on the ABS so as to protect the element section from the damage accompanying the contact with the recording medium. In some cases, the ABS protective layer is not formed. The sensing circuit may be formed on a head gimbal assembly (HGA) having the GMR head installed therein or on the circuit board of the magnetic recording-reproducing apparatus.

The construction of the GMR head according to the present embodiment will now be described schematically with reference to FIG. 1B. A lower magnetic shield (a first magnetic shield) 17, a first insulating layer 13, a magnetoresistive element (which will be described herein later in detail), a second insulating film 15, and an upper magnetic shield (a second magnetic shield) 19 are stacked in the order mentioned on a substrate (not shown). As described above, the magnetoresistive element is formed between the pair of magnetic shields 17 and 19 with the insulating layers 13 and 15 interposed between the magnetoresistive element and the magnetic shields 17 and 19, respectively. The edge surfaces of the lower magnetic shield 17, the magnetoresistive element and the upper magnetic shield 19 on the left side in FIG. 1B constitute the air-bearing surface (ABS).

The magnetoresistive element according to the present embodiment comprises a magnetization free layer 1, a nonmagnetic intermediate layer 3, and a magnetization pinned layer 5, which are arranged in the order mentioned in the height direction as viewed from the ABS. Junctions are formed between the nonmagnetic intermediate layer 3 and the magnetization free layer 1 and between the nonmagnetic intermediate layer 3 and the magnetization pinned layer 5. The magnetization free layer 1 is a layer whose magnetization direction may be changed in accordance with an external magnetic field, and the magnetization pinned layer 5 is a layer whose magnetization direction is substantially left unchanged even under an external magnetic field.

The magnetization pinned layer 5 is electrically connected to a first electrode 7 formed adjacent to the magnetization pinned layer 5. The magnetization free layer 1 is electrically connected to the upper magnetic shield 19 through a pillar electrode 21. Each of the first electrode 7 and the upper magnetic shield 19 is connected through wiring to a circuit (not shown) for detecting and calculating the electrical resistance. Each of the first electrode 7, the pillar electrode 21 and the upper magnetic shield 19 is formed of a conductive material.

As shown in FIGS. 1A and 1C, insulating layers 9 and 11 are formed on both sides of the magnetization free layer 1, the nonmagnetic intermediate layer 3, the magnetization pinned layer 5 and the first electrode 7 in the track width direction.

If a sense current is made to flow in the magnetization free layer 1, the nonmagnetic intermediate layer 3 and the magnetization pinned layer 5 through the first electrode 7 and the upper magnetic shield 19 (pillar electrode 21), electrons are scattered at the interfaces depending on the relative angle made between the magnetization direction of the magnetization free layer 1 and the magnetization direction of the magnetization pinned layer 5, so that the electrical resistance is changed (giant magnetoresistive effect).

To be more specific, the magnetization of the magnetization free layer 1 arranged in a region near the ABS is rotated by the signal magnetic field generated from the magnetic recording medium so that the magnetization direction is changed. The spin information of the electrons as the sense current is changed in accordance with the change in the magnetization direction. When the electrons having the spin information pass through the nonmagnetic intermediate layer 3, if the electrons are scattered at the interfaces between the magnetization pinned layer 5 and the nonmagnetic intermediate layer 3, the electrical resistance is raised, while if electrons pass through without being scattered, the electrical resistance is lowered. The scattering of electrons is rendered maximum in the case where the spin information owned by the electrons is antiparallel to the magnetization direction of the magnetization pinned layer 5 and is rendered minimum in the case where the spin information and the magnetization direction noted above are parallel to each other. It follows that the resistance is rendered maximum if the magnetization directions of the magnetization free layer 1 and the magnetization pinned layer 5 are antiparallel and is rendered minimum if the magnetization directions noted above are parallel to each other. The change in the resistance value is proportional to the cosine of the relative angle between the magnetization direction of the magnetization free layer 1 and the magnetization direction of the magnetization pinned layer 5 (spin-valve magnetoresistive effect). Therefore, it is possible to detect the change in the signal magnetic field by measuring the electrical resistance value between the magnetization free layer 1 and the magnetization pinned layer 5.

In the present embodiment, the magnetization free layer 1, the nonmagnetic intermediate layer 3, the magnetization pinned layer 5, and the first electrode 7 are formed on the insulating layer 13 in the order mentioned in the height direction of the head as viewed from the ABS. As a result, it is possible to design the GMR head such that the distance between the magnetic shields 17 and 19 is smaller than that in the conventional shielded GMR head. For example, it is possible to achieve a shield-to-shield distance of about 20 nm in the present embodiment, though it was impossible to achieve such a small shield-to-shield distance in the conventional shielded GMR head. It follows that the present embodiment is highly effective for achieving a super high density recording in the future.

In the present embodiment, the magnetization free layer 1 and the magnetization pinned layer 5 are not stacked in the vertical direction (the track direction) between shields as in the conventional apparatus, but are arranged in the lateral direction between shields with the nonmagnetic intermediate layer 3 interposed therebetween, i.e., arranged a prescribed distance apart from each other in the lateral direction. As a result, it is possible to suppress magnetostatic coupling and/or interlayer exchange coupling between the ferromagnetic layers. Also, it is possible to reduce the thickness of the intermediate layer 3 to 2.0 nm or less. If the intermediate layer 3 is made as thin as above, it is possible to suppress inelastic scattering of the spins due to quantum conduction effect.

Where the magnetization pinned layer 5 is stacked on the magnetization free layer 1 formed on the substrate and is processed to form a fine pattern by etching as in the prior art, the etching proceeds from the magnetization pinned layer 5 or from the antiferromagnetic layer formed on the magnetization pinned layer 5, with the result that the processed size of the magnetization free layer 1 is rendered broader than the prescribed size. This gives rise to inconveniences such that the track width is broadened. On the other hand, in the structure according to the present embodiment, the magnetization free layer 1 and the magnetization pinned layer 5 can be processed individually so as to make it possible to realize the magnetization free layer 1 having a precise size.

The magnetization free layer 1 is formed of a ferromagnetic material having such a coercivity as to permit the magnetization direction to be rotated under the prescribed external magnetic field.

The magnetization direction of the magnetization pinned layer 5 can be pinned by forming an antiferromagnetic layer on the magnetization pinned layer 5 so as to achieve antiferromagnetic coupling. Also, the magnetization pinned layer 5 can be formed by using a ferromagnetic material having such a coercivity as not to permit the magnetization direction to be rotated under the prescribed external magnetic field and by pinning the magnetization direction by application of, for example, a prescribed heat treatment.

It is necessary for each of the magnetization free layer 1 and the magnetization pinned layer 5 to exhibit ferromagnetism. It is possible for each of the magnetization free layer 1 and the magnetization pinned layer 5 to be a layer formed of a ferromagnetic material alone or a layer formed of a ferromagnetic material and another material added to the ferromagnetic material in such an amount that the ferromagnetism is not impaired. It is also possible for each of the magnetization free layer and the magnetization pinned layer to have a stacked structure consisting of a plurality of different ferromagnetic films. Further, it is possible for each of the magnetization free layer and the magnetization pinned layer may be a stacked film of a ferromagnetic film and another nonmagnetic film, e.g., the underlayer or the protective layer shown in FIGS. 2 and 3.

The first insulating film 13 for electrically insulating the lower magnetic shield 17 from the magnetization free layer 1, the nonmagnetic intermediate layer 3, the magnetization pinned layer 5 and the first electrode 7 forms a lower magnetic gap. The second insulating film 15 for electrically insulating the upper magnetic shield 19 from the magnetization free layer 1, the nonmagnetic intermediate layer 3, the magnetization pinned layer 5 and the first electrode 7 forms an upper magnetic gap. Each of the insulating layers 9, 11, 13 and 15 shown in FIGS. 1A, 1B and 1C is formed of an insulating material such as $Al_2O_3$ or $SiO_2$.

If the pillar electrode 21 sandwiched between the upper magnetic shield 19 and the magnetization free layer 1 is formed of a nonmagnetic conductor, the pillar electrode 21 serves as a magnetic gap. It is possible for the pillar electrode 21 to be exposed to the ABS or to be recessed from the ABS as far as the pillar electrode 21 can be connected to the magnetization free layer 1. Where the pillar electrode 21 is formed in a position deviated from the clearance between the magnetization free layer 1 and the upper magnetic shield 19, it is possible to form a magnetic gap such as a nonmagnetic insulator between the magnetization free layer 1 and the upper magnetic shield 19. In order to make the magnetic gap narrow, it is possible for the pillar electrode 21 to be formed of a conductive ferromagnetic material like the upper magnetic shield 19.

The pillar electrode 21 has a cross-sectional area smaller than that of the magnetization free layer 1 as denoted by a dotted line in FIG. 1A showing the GMR head sectioned in the direction parallel to the track width direction. In this case, the effective track width can be defined by means of the pillar electrode is 21. To be more specific, the effective track width is defined by the width of the pillar electrode 21 in the ABS shown in FIG. 1A. As a result, the width of the magnetization free layer 1 can be made larger than the effective track width so as to improve the reproducing efficiency of the magnetic head.

In general, a magnetic material has an exchange coupling length of about 0.05 μm to 0.1 μm. If the magnetic material is processed smaller than the exchange coupling length, motion of the magnetization spin in the magnetic material is suppressed by the exchange coupling, with the result that the sensitivity to the external magnetic field is significantly lowered. Thus, where the size of the magnetization free layer is reduced, the sensitivity and the magnetic head efficiency tend to be lowered. Therefore, if the length of the magnetization free layer in the track width direction is made larger than the exchange coupling length, the sensitivity to the external magnetic field will be ensured. Also, if the pillar electrode is made smaller than the magnetization free layer in the track width direction, it is possible to flow the sense current into the highly sensitive portion of the magnetization free layer. As a result, it is possible to obtain a high output while maintaining the reproducing efficiency of the magnetic head.

Incidentally, the pillar electrode 21 and the magnetization free layer 1 shown in FIG. 1A may have the same cross-sectional area, in the case where a sufficiently small effective track width can be defined by the magnetization free layer 1 or where the restriction on the effective track width is not severe.

Figure 2A:
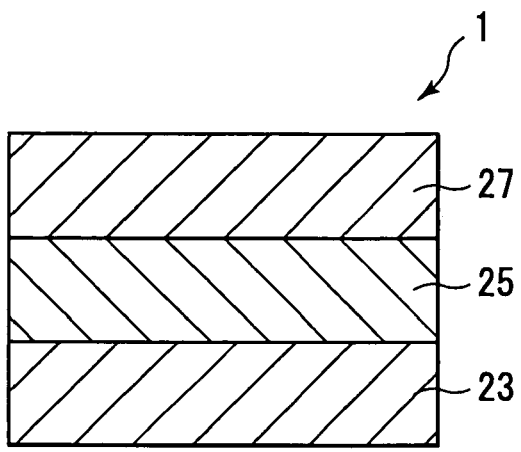
FIGS. 2A to 2C are cross-sectional views each exemplifying the construction of the magnetization free layer included in the GMR head according to the first embodiment of the present invention.
Figure 2B:
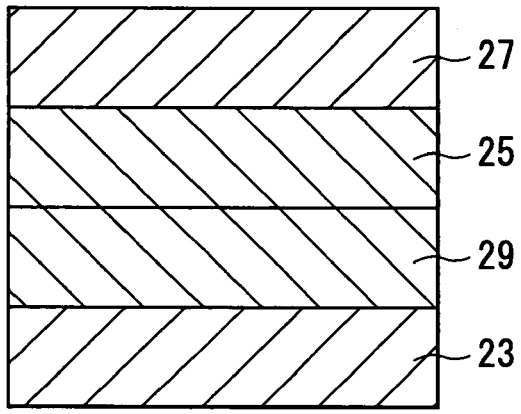
Figure 2C:
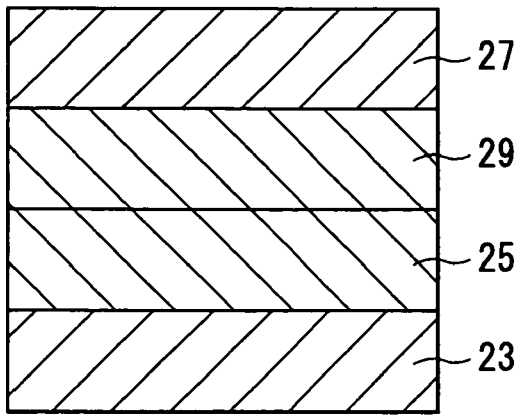

FIGS. 2A, 2B and 2C exemplify the construction of the magnetization free layer 1. These drawings show the cross sections of the magnetization free layers sectioned in a direction parallel to the track direction.

FIG. 2A shows a stack of the underlayer 23, the magnetization free layer 25, and the protective layer 27. FIG. 2B shows a stack of the underlayer 23, the stacked biasing layer 29, the magnetization free layer 25, and the protective layer 27. FIG. 2C shows a stack of the underlayer 23, the magnetization free layer 25, the stacked biasing layer 29, and the protective layer 27. The underlayer 23 is in contact with the first insulating layer 13 shown in FIG. 1B, and the protective layer 27 is in contact with the pillar electrode 21 shown in FIG. 1B.

If the magnetization free layer 1 is formed of a magnetic layer alone, spin-dependent scattering of the conductive electrons is brought about at the interface between the nonmagnetic intermediate layer 3 and the magnetization free layer 1. On the other hand, where the underlayer 23 and the protective layer 27 made of a nonmagnetic material are stacked in addition to the magnetization free layer 25 (and the stacked biasing layer 29), the spin-dependent scattering of the conductive electrons is brought about at the interface between the magnetization free layer 25 (and the stacked biasing layer 29) and the nonmagnetic intermediate layer 3.

The magnetization free layer 25 is formed of Co, Fe or Ni, or a ferromagnetic material including an alloy containing at least 50 atomic % (at %) of any of these metals. It is also possible for the magnetization free layer 25 to be of a stacked film formed of a plurality of ferromagnetic layers made of different materials or having different compositions. To be more specific, it is possible for the magnetization free layer 25 to be formed of $Co_{90}Fe_{10}$ (the composition ratio being at %), CoFeNi, $Ni_{80}Fe_{20}$ (the composition ratio being at %), Fe, Co or Ni.

In order to produce the spin-dependent scattering effect inside the magnetization free layer 25, the magnetization free layer 25 should be of a stacked structure of [ferromagnetic layer/ferromagnetic layer] and the repetition thereof, of a stacked structure of [ferromagnetic layer/nonmagnetic layer] and the repetition thereof, or of a complex structure prepared by stacking these two stacked structures. The expression [A layer/B layer] used in the present specification denotes the stacked structure prepared by forming [A layer] on the insulating layer 13 and [B layer] on the [A layer].

For the stacked free layer of the [ferromagnetic layer/ferromagnetic layer], the combination of [NiFe/CoFe], [Fe/NiFe], or [Fe/CoFe] can be utilized. The nonmagnetic layer included in the stacked free layer of the [ferromagnetic layer/nonmagnetic layer] can be formed of a noble metal selected from the group consisting of Au, Ag, Cu, Ir, Ru, Rh, Pd, and Pt. The combination that permits increasing the scattering at the interface between the ferromagnetic layer and the nonmagnetic layer within the stacked free layer includes, for example, [NiFe/Au], [NiFe/Ag], [CoFe/Cu], [Co/Cu], [Fe/Au], and [Ni/Au].

It is possible for the magnetization free layer 25 to be formed of a ferricoupling layer (synthetic free layer) of the [magnetic layer/Ru/magnetic layer] so as to adjust the Ms×t product (product between the saturation magnetization and the thickness).

The underlayer 23 is formed of, for example, Ta/NiFeCr, a NiFeCr alloy, Ta/Cu, Ta/Cu/Au, Ta/Ru, or Ta/NiFe. The underlayer formed of the material exemplified above permits the magnetization free layer 25 to be (111)-oriented so as to improve the soft magnetic characteristics thereof. It follows that the coercivity of the magnetization free layer can be lowered and the absolute value of the saturation magnetostriction can be controlled.

The protective layer 27 is formed typically of a Ta layer and preferably formed of a stack of a Ta layer and a noble metal layer such as Ta/Au (or Pt, Ir, Ru, Rh). Since the noble metal layer included in the stack exhibits resistance to RIE (Reactive Ion Etching), the noble metal layer acts as a stopper layer in RIE applied in the pillar forming process, making it possible to suppress damage to the magnetization free layer 25 caused by over-etching. The noble metal layer is also effective for decreasing contact resistance with the pillar electrode 21.

Figure 3A:
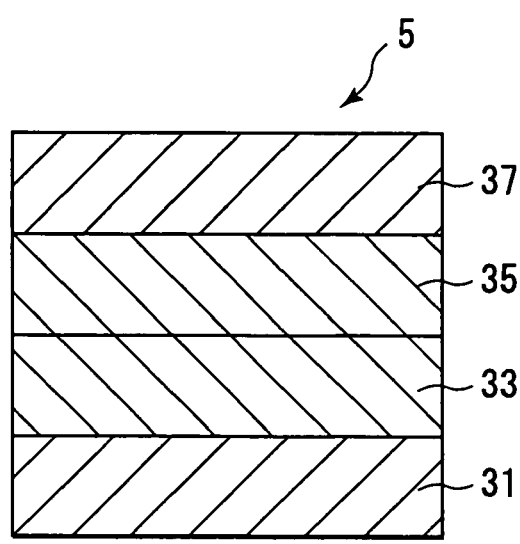
FIGS. 3A to 3C are cross-sectional views each exemplifying the construction of the magnetization pinned layer included in the GMR head according to the first embodiment of the present invention.
Figure 3B:
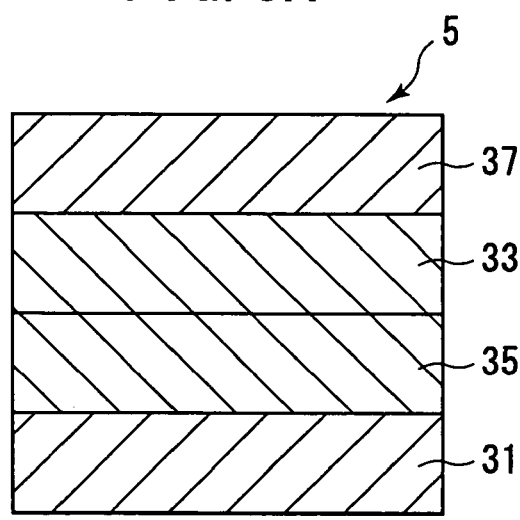
Figure 3C:
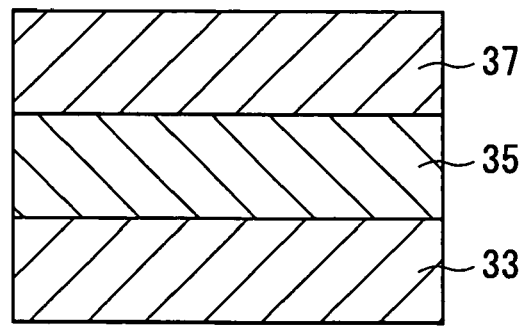

FIGS. 3A, 3B and 3C exemplify the construction of the magnetization pinned layer 5. These drawings show the cross sections of the magnetization pinned layers sectioned in a direction parallel to the track direction.

FIG. 3A shows a stack of the underlayer 31, the magnetization pinned layer 33, the antiferromagnetic film 35, and the protective layer 37. FIG. 3B shows a stack of the underlayer 31, the antiferromagnetic film 35, the magnetization pinned layer 33 and the protective layer 37. FIG. 3C shows a stack of the underlayer 31, the magnetization pinned layer 33, and the protective layer 37. Exchange coupling is exerted between the antiferromagnetic film 33 and the magnetization pinned layer 35.

The magnetization pinned layer 35 is formed of a metal selected from the group consisting of Co, Fe and Ni or a ferromagnetic material including an alloy containing at least 50 at % of any of the metals noted above. To be more specific, the magnetization pinned layer 35 is formed of, for example, $Co_{90}Fe_{10}$ (the composition ratio being at %), CoFeNi, $Ni_{80}Fe_{20}$ (the composition ratio being at %), Fe, Co or Ni.

In order to produce the spin-dependent scattering effect inside the magnetization pinned layer, the magnetization pinned layer should be of a stacked structure of [ferromagnetic layer/ferromagnetic layer] and the repetition thereof, of a stacked structure of [ferromagnetic layer/nonmagnetic layer] and the repetition thereof, or of a complex structure prepared by stacking these two stacked structures.

For the stacked pinned layer of the [ferromagnetic layer/ ferromagnetic layer], the combination of [NiFe/CoFe], [Fe/ NiFe], or [Fe/CoFe] can be utilized. The nonmagnetic layer included in the stacked pinned layer of the [ferromagnetic layer/nonmagnetic layer] can be formed of a noble metal selected from the group consisting of Au, Ag, Cu, Ir, Ru, Rh, Pd, and Pt. The combination of the [ferromagnetic layer/ nonmagnetic layer] that permits increasing the scattering at the interface between the ferromagnetic layer and the nonmagnetic layer includes, for example, [NiFe/Au], [NiFe/ Ag], [CoFe/Cu], [Co/Cu], [Fe/Au], and [Ni/Au].

For improving the pinning resistance, it is desirable to use a ferricoupling layer (synthetic pinned layer) formed of [magnetic layer/Ru/magnetic layer].

It is possible for the antiferromagnetic film 33 to be formed of, for example, an alloy selected from PtMn, IrMn, RhMn, CrMn, CrPtMn, and FeMn.

In FIG. 3C, a hard magnetic material is used for the magnetization pinned layer 35 so as to make it possible to omit the antiferromagnetic film 33. The hard magnetic materials used for the magnetization pinned layer 35 include, for example, an alloy selected from CoPt, FeCo and SmCo. It is also possible to stack the hard magnetic layer and the magnetization pinned layer 35 formed of the materials noted above so as to permit the magnetization of the magnetization pinned layer 35 to be pinned by a stray magnetic flux from the hard magnetic layer.

The nonmagnetic intermediate layer 3 is formed mainly of a conductive nonmagnetic material selected from the group consisting of Be, Al, Mg, Ca, Cu, Au, Ag, Rh, Ru, and Ir. However, where it is desirable for the magnetoresistive effect to be developed by, for example, domain walls, it is possible to use a conductive magnetic material for the nonmagnetic intermediate layer 3. Also, in the case of utilizing the tunneling magnetoresistive effect (TMR), the nonmagnetic intermediate layer is formed of an insulating material such as $Al_2O_3$ and $SiO_2$. The term "intermediate layer" used herein covers a nonmagnetic conductive intermediate layer, a magnetic conductive intermediate layer, and a nonmagnetic insulating intermediate layer.

If a nonmagnetic conductive material is used for the nonmagnetic intermediate layer 3, it is possible to obtain a sufficiently large spin diffusion length of about 50 nm or more. Therefore, spin electrons are transmitted from the magnetization free layer 1 to the magnetization pinned layer 5 while maintaining the spin information, with the result that it is possible to obtain a higher MR ratio.

In order to obtain a sufficient spin diffusion length, it is possible to use a carbon-based material such as carbon nanotube for the nonmagnetic intermediate layer 3. However, attentions should be paid in that the junction between the nonmagnetic intermediate layer 3 of the carbon nanotube and the magnetization free layer 1 or the magnetization pinned layer 5 will be made a metal/semiconductor junction. To be more specific, a compound layer or an oxide layer tends to be formed on the metal/semiconductor junction and, thus, a barrier that obstructs the transmission of the spin electrons tends to be formed by these compound and oxide layers. Therefore, it is desirable to form a noble metal layer consisting of, for example, Pt or Au between the metal layer and the semiconductor layer. Incidentally, in the TMR in which a nonmagnetic insulating material is used for the intermediate layer so as to utilize the spin tunnel conduction, the junction does not pose any problem.

Where a nonmagnetic conductive material is used for the nonmagnetic intermediate layer 3, it is desirable to use a specular film producing a mirror reflection effect as an underlayer or a protective layer of the nonmagnetic intermediate layer 3. It is also possible to employ a stacked structure prepared by repeatedly laminating a specular film and a nonmagnetic intermediate layer. It is possible to use an oxide, a nitride, a fluoride, or a boride of a magnetic material or a nonmagnetic material for the specular film. In this case, it is possible to suppress an inelastic scattered component at the interface between the nonmagnetic intermediate layer and the underlayer or the protective layer so as to make it possible to increase the spin diffusion length of the conduction electrons within the nonmagnetic intermediate layer, thereby improving the MR ratio.

If the thickness of the intermediate layer is set at about 1 nm or less and the width of the intermediate layer is set at about 10 nm in the case of using a magnetic conductive material for the intermediate layer, the current path of the conduction electrons is rendered very short and, thus, the electrons are quantum-mechanically conducted. As a result, it is possible to produce a greater MR effect because of a ballistic effect. The magnetic conductive material used for the intermediate layer includes, for example, Ni, Co, Fe and an alloy containing any of these metals. In order to shorten the conduction path of the electrons, it is possible to use a granular film containing fine magnetic particles comprising Ni, Fe or Co.

The pillar electrode 21 may be formed between the magnetization free layer 1 and the lower magnetic shield 17. In this case, the lower magnetic shield 17 is used as an electrode. On the other hand, an insulating nonmagnetic layer is formed between the magnetization free layer 1 and the upper magnetic shield 19. It is possible for the nonmagnetic material layer to be formed integral with the insulating layer 15 or to be formed separately.

An electrode may be formed adjacent to the magnetization free layer 1. In this case, it is unnecessary to use the magnetic shields 17 and 19 as electrodes.

Figure 4A:
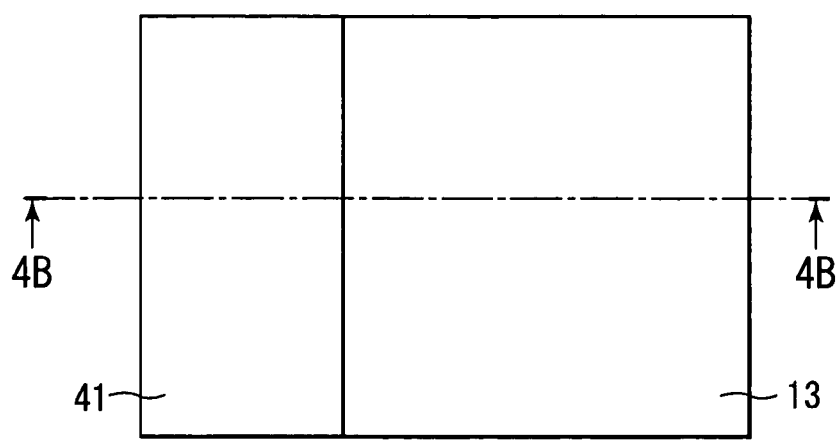
FIGS. 4A and 4B are a plan view and a cross-sectional view, respectively, intended to explain the manufacturing method of the GMR head according to the first embodiment of the present invention.
Figure 4B:
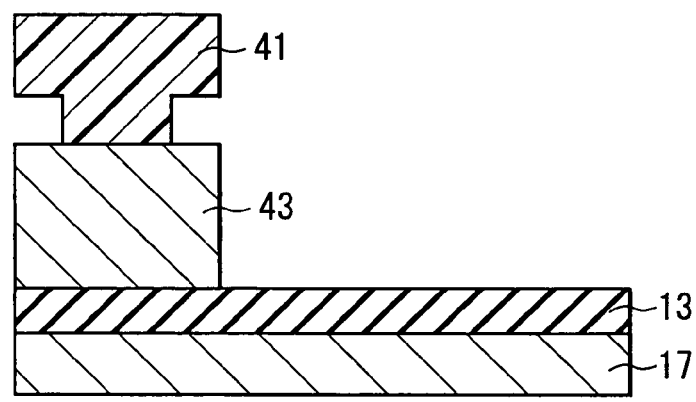
Figure 5A:
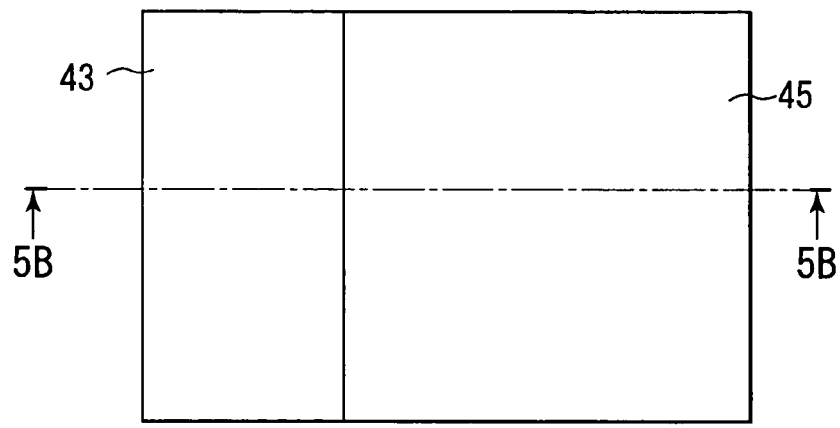
FIGS. 5A and 5B are a plan view and a cross-sectional view, respectively, intended to explain the manufacturing method of the GMR head according to the first embodiment of the present invention.
Figure 5B:
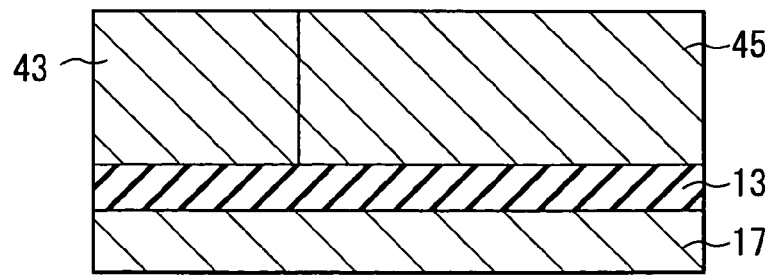

The manufacturing method of the GMR head shown in FIGS. 1A, 1B, and 1C will now be described with reference to FIGS. 4A, 4B, 5A, 5B, 6A, 6B, 7A, 7B, 8A, 8B, 9A, 9B, 10A, 10B, 11A, and 11B. Incidentally, the letter "A" accompanying the drawing number, e.g., FIG. 4A, denotes that the drawing is a plan view showing the upper surface of the head during the manufacturing process, and the letter "B" denotes that the drawing shows a cross-section along the line B—B, e.g., line 4B—4B, put in the plan view.

In the first step, a $Ni_{80}Fe_{20}$ layer having a thickness of about 200 nm is formed on, for example, an $Al_2O_3$—TiC substrate (not shown) by plating or sputtering so as to form the lower magnetic shield 17. Then, an $Al_2O_3$ layer is formed on the lower magnetic shield 17 in a thickness of about 10 nm by an IBS (ion beam sputtering) so as to form the first insulating layer 13.

Next, an underlayer, a stacked biasing layer, a magnetization free layer, and a protective layer are successively formed on the insulating layer 13 by sputtering so as to form a stacked film 43 for the magnetization free layer. The underlayer includes a Ta film having a thickness of about 5 nm and a Ru film having a thickness of about 2 nm. The stacked biasing layer includes an IrMn film having a thickness of about 10 nm, a CoFe film having a thickness of about 5 nm, a Cu film having a thickness of about 1 nm, a Ru film having a thickness of about 2 nm, and a Cu film having a thickness of about 1 nm. The magnetization free layer is formed of a NiFe film having a thickness of about 5 nm. The protective layer includes a Ta film having a thickness of about 5 nm and an Au film having a thickness of about 2 nm. Then, the stacked film 43 for the magnetization free layer is patterned by ion beam etching with using a T-shaped two-layer resist 41 as a mask (see FIGS. 4A and 4B).

In the next step, an underlayer, an antiferromagnetic layer, a magnetization pinned layer, and a protective layer are successively formed on the entire surface by sputtering so as to form a stacked film 45 for the magnetization pinned layer. The underlayer includes a Ta film having a thickness of about 5 nm and a Ru film having a thickness of about 2 nm. The antiferromagnetic layer is formed of a PtMn film having a thickness of about 15 nm. The magnetization pinned layer includes a CoFe film having a thickness of about 3 nm, a Ru film having a thickness of about 1 nm, and a CoFe film having a thickness of about 3 nm. The protective layer is formed of a Ta film having a thickness of about 5 nm. Then, that portion of the stacked film for the magnetization pinned layer deposited on the resist 41 is lifted off so as to leave the stacked film 45 for the magnetization pinned layer adjacent to the stacked film 43 for the magnetization pinned layer on the insulating film 13 (see FIGS. 5A and 5B).

Figure 6A:
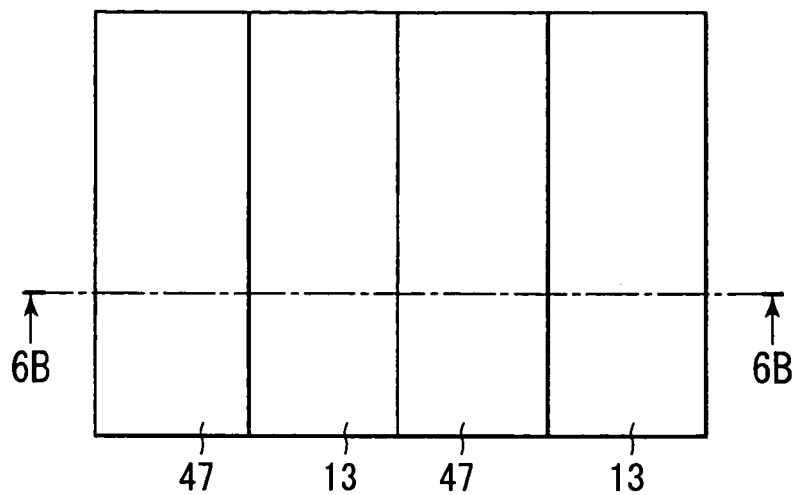
FIGS. 6A and 6B are a plan view and a cross-sectional view, respectively, intended to explain the manufacturing method of the GMR head according to the first embodiment of the present invention.
Figure 6B:
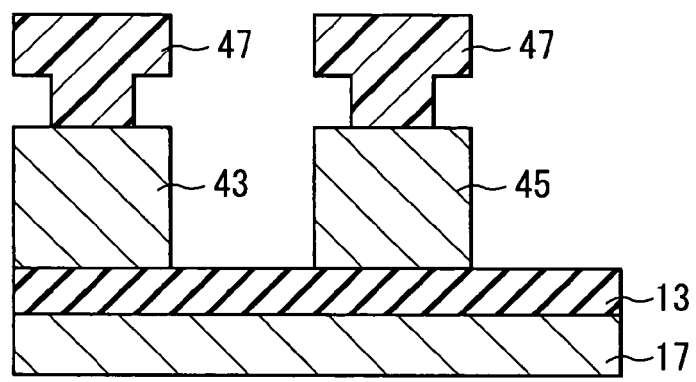
Figure 7A:
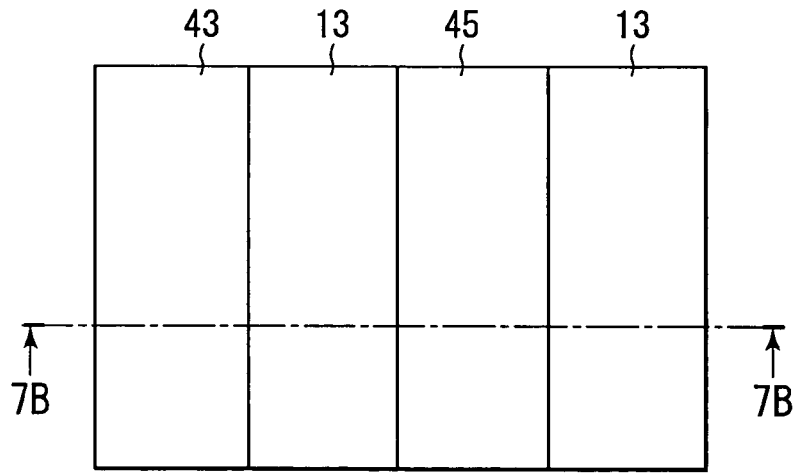
FIGS. 7A and 7B are a plan view and a cross-sectional view, respectively, intended to explain the manufacturing method of the GMR head according to the first embodiment of the present invention.
Figure 7B:
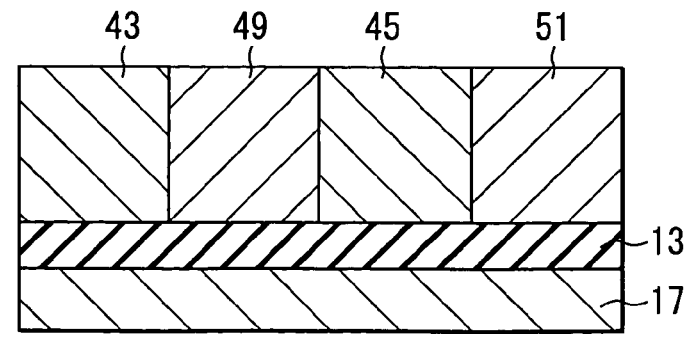

In the next step, the stacked film 43 for the magnetization free layer and the stacked film 45 for the magnetization pinned layer are patterned by ion beam etching with using a T-shaped two-layer resist 47 as a mask (see FIGS. 6A and 6B).

In the next step, a Cu film having a thickness of about 30 nm used for the nonmagnetic intermediate layer 3 and the first electrode 7 are formed on the entire surface. Then, the Cu film on the resist 47 is lifted off so as to form a Cu film 49 for the nonmagnetic intermediate layer and a Cu film 51 for the first electrode (see FIGS. 7A and 7B).

Figure 8A:
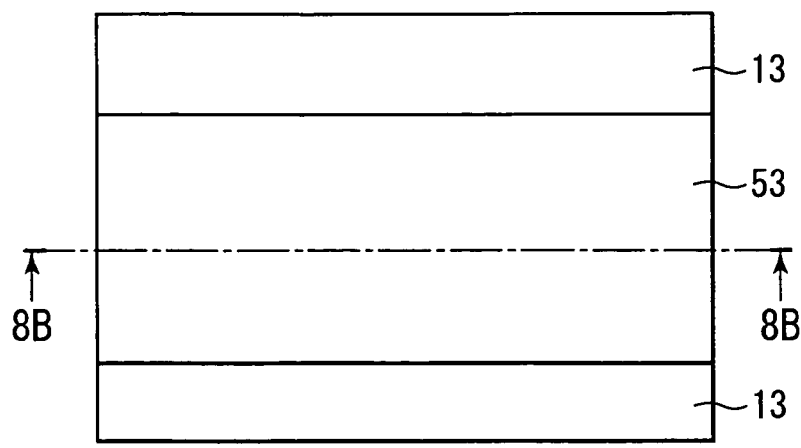
FIGS. 8A and 8B are a plan view and a cross-sectional view, respectively, intended to explain the manufacturing method of the GMR head according to the first embodiment of the present invention.
Figure 8B:
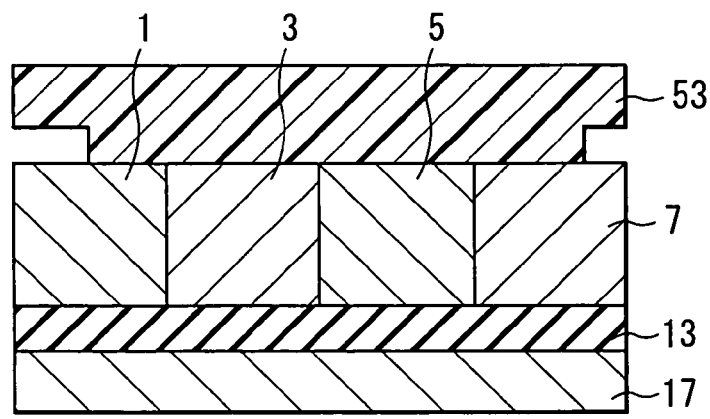

In the next step, with using a T-shaped two-layer resist 53 as a mask, the stacked film 43 for the magnetization free layer, the Cu film 49 for the nonmagnetic intermediate layer, the stacked film 45 for the magnetization free layer, and the Cu film 51 for the first electrode are partly removed by ion beam etching so as to achieve the patterning in a manner to define the track width (vertical direction in FIG. 8A). In such a manner, the magnetization free layer 1, the nonmagnetic intermediate layer 3, the magnetization pinned layer 5 and the first electrode 7 are formed (see FIGS. 8A and 8B).

Figure 9A:
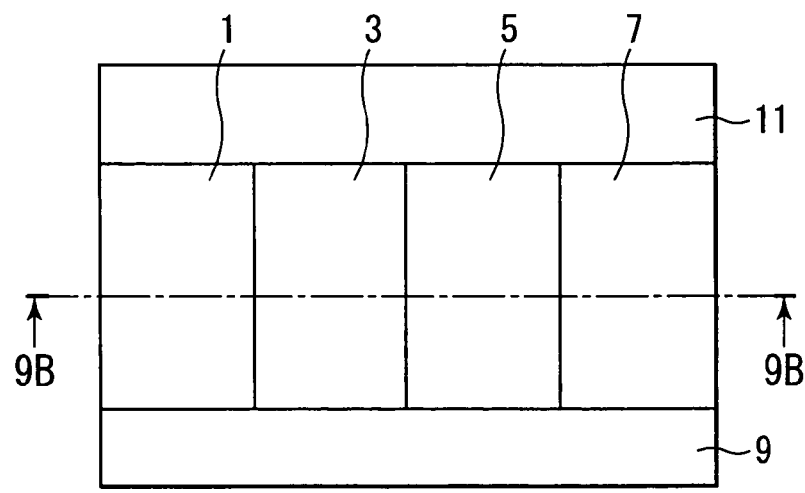
FIGS. 9A and 9B are a plan view and a cross-sectional view, respectively, intended to explain the manufacturing method of the GMR head according to the first embodiment of the present invention.
Figure 9B:
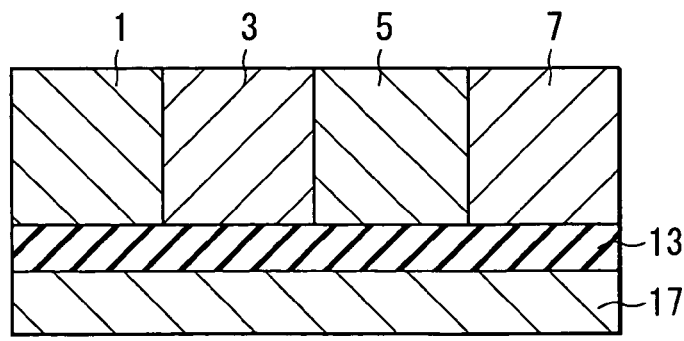
Figure 10A:
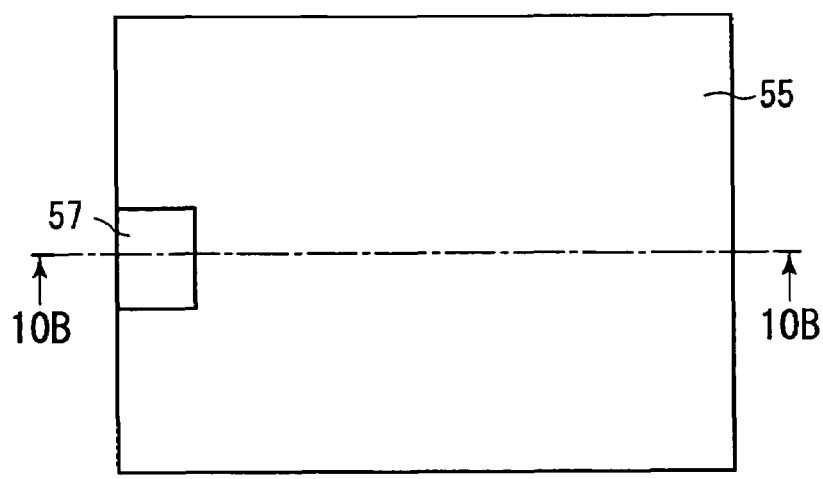
FIGS. 10A and 10B are a plan view and a cross-sectional view, respectively, intended to explain the manufacturing method of the GMR head according to the first embodiment of the present invention.
Figure 10B:
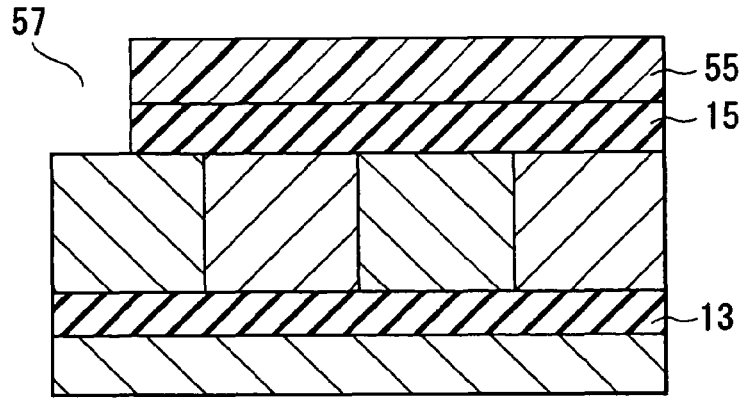

In the next step, an $Al_2O_3$ film is formed on the entire surface in a thickness of about 30 nm, followed by lifting off that portion of the $Al_2O_3$ film on the resist 53 so as to form the insulating layers 9 and 11 (see FIGS. 9A and 9B).

In the next step, a $SiO_2$ film is formed on the entire surface in a thickness of about 30 nm, followed by performing CMP (chemical mechanical polishing) of the surface of the $SiO_2$ film until the thickness of the $SiO_2$ film is decreased to about 20 nm. Then, a resist 55 is formed by photolithography. The $SiO_2$ film is partly etched by RIE (reactive ion etching) with using the resist 55 as a mask so as to form a contact hole 57 for the pillar electrode 21. The contact hole has a width of about 0.1 μm in the track width direction (vertical direction in FIG. 10A). It should be noted that the $SiO_2$ film surrounding the contact hole corresponds to the second insulating film 15 in FIG. 1 (see FIGS. 10A and 10B).

Figure 11A:
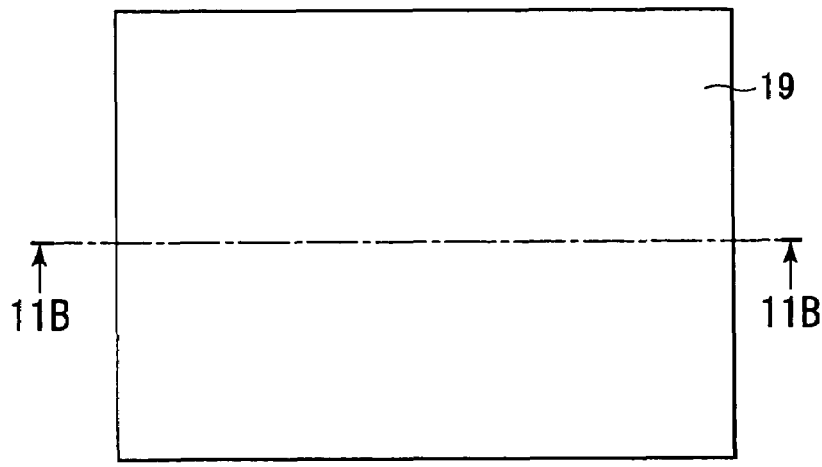
FIGS. 11A and 11B are a plan view and a cross-sectional view, respectively, intended to explain the manufacturing method of the GMR head according to the first embodiment of the present invention.
Figure 11B:
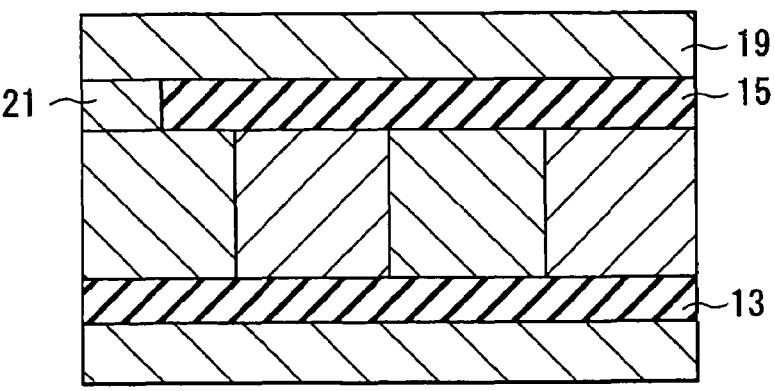

In the next step, the resist 55 is removed, followed by forming a NiFe film in a thickness of about 300 nm in a manner to fill the contact hole 57 and to cover the insulating film 15, thereby forming the pillar electrode 21 and the upper shield 19 (see FIGS. 11A and 11B).

Then, wiring is formed in a manner to connect the first electrode 7 and the upper shield 19 to a sensing circuit and so on. Further, the surface on the side of the magnetization free layer 1 is polished so as to form the air-bearing surface (ABS), followed by forming a protective layer for covering the ABS, thereby completing the manufacture of the GMR head according to the first embodiment.

The GMR head according to the first embodiment can be formed on the wafer level by the manufacturing method described above.

Second Embodiment

Figure 12A:
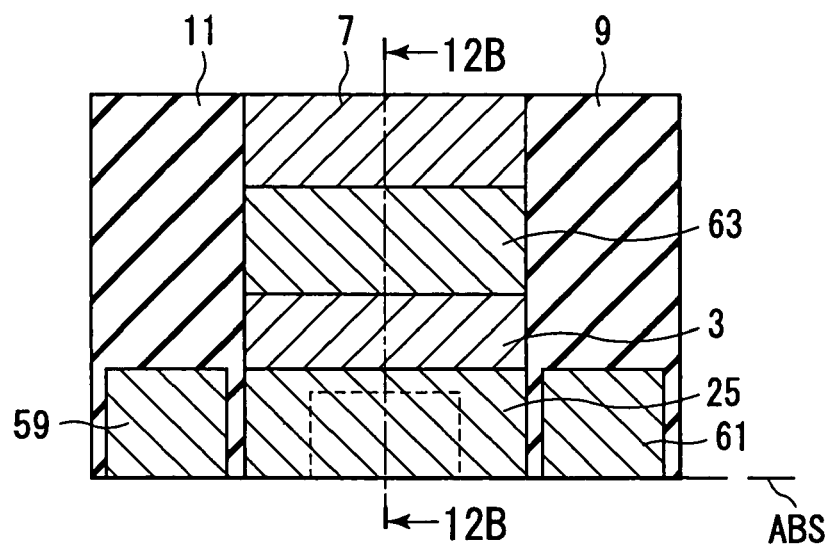
FIG. 12A is a cross-sectional view of a GMR head according to a second embodiment of the present invention in a direction parallel to the track width direction.
Figure 12B:
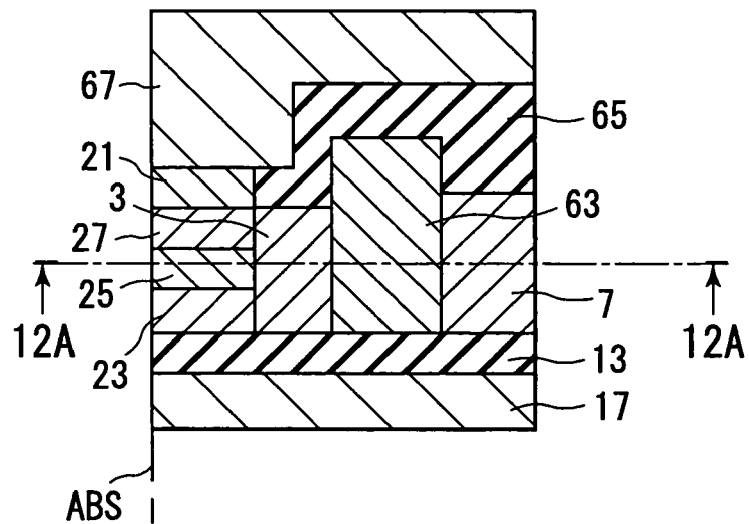
FIG. 12B is a cross-sectional view of the GMR head in a direction parallel to the track direction.
Figure 12C:
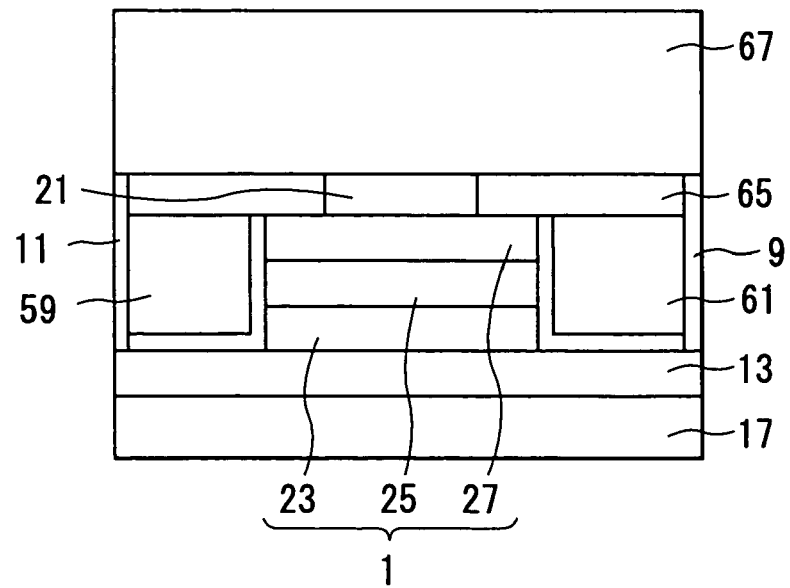
FIG. 12C is a plan view of the GMR head as viewed from the air-bearing surface.

The GMR head according to a second embodiment of the present invention will now be described. FIG. 12A is a cross-sectional view of the GMR head sectioned in a direction parallel to the track width direction, FIG. 12B is a cross-sectional view of the GMR head sectioned in a direction parallel to the track direction, and FIG. 12C is a plan view of the GMR head as viewed from the ABS. FIG. 12A is a cross-sectional view along the line 12A—12A shown in FIG. 12B. The surface on the lower side of the drawing denotes the ABS. FIG. 12B is a cross-sectional view along the line 12B—12B shown in FIG. 12A. The surface on the left side of the drawing denotes the ABS. The GMR head according to the present embodiment comprises an insulating nonmagnetic film surrounding the members referred to above and wiring for connecting the electrode of an SV element to a sensing circuit and so on in addition to the members shown in FIGS. 12A to 12C.

As shown in FIGS. 12B and 12C, a stack of the underlayer 23, the magnetization free layer 25 and the protective layer 27 is formed. Also, a pair of hard biasing layers 59 and 61, which are configured to impart a longitudinal bias, are formed as shown in FIGS. 12A and 12C. The longitudinal bias is a magnetic bias in the left-to-right direction in FIG. 12C, which is parallel to the ABS and also parallel to the surface of the magnetization free layer 25. In order to impart the magnetic bias efficiently to the magnetization free layer 25, it is desirable to form hard biasing layers 59 and 61 on both sides of the magnetization free layer 25 so as to extend in the track width direction.

It is possible to use Co-based hard magnetic materials such as CoPt, CoCr, and CoCrPt or another hard magnetic material for the hard biasing layers 59 and 61. The hard biasing layers 59 and 61 may be formed on an underlayer such as a Cr layer having a thickness of about 1 nm to about 20 nm.

It is desirable for the hard biasing layers 59, 61 to be electrically isolated from the magnetization free layer by the insulating layers 9 and 11, as shown in FIGS. 12A and 12C. It is possible to use, for example, $Al_2O_3$ or $SiO_2$ for the insulating layers 9, 11, 13, and 65. It is desirable for each of the insulating layers 9 and 11 interposed between the hard biasing layers 59, 61 and the magnetization free layer 25 to have a thickness falling within a range of between about 2 nm and about 10 nm. In order to ensure the insulating properties, it is necessary for each of the insulating layers 9 and 11 to have a thickness of at least about 2 nm. The thickness of each of the insulating layers 9 and 11 should not exceed about 10 nm in order to ensure the biasing magnetic field.

It is possible to omit the hard biasing layers 59, 61 and to stack an antiferromagnetic layer on the magnetization free layer 25 so as to impart a longitudinal bias to the magnetization free layer 25. To be more specific, it is possible to employ any of constructions (1) and (2) given below: (1) An antiferromagnetic layer is formed on the magnetization free layer 25 with a nonmagnetic conductive film interposed therebetween. The particular construction permits exchange coupling between the antiferromagnetic film and the ferromagnetic film with the nonmagnetic film interposed therebetween (long-distance exchange coupling method). (2) An antiferromagnetic film, a biasing ferromagnetic film, a nonmagnetic film, and a magnetization free layer 25 are formed in the order mentioned. The particular construction permits the magnetization direction and the magnetic anisotropy of the magnetization free layer to be controlled by a stray magnetic field from the biasing ferromagnetic film pinned by the antiferromagnetic film (magnetostatic coupling method). In the stacked structures described above, although the individual films can be stacked consecutively, the stacking order is not limited.

For the antiferromagnetic film, an alloy selected from IrMn, PtMn, CrMn, PtCrMn, RhMn, and FeMn may be used.

Where antiferromagnetic films are used for both of the magnetization pinned layer and the magnetization free layer, it is desirable to make the directions of magnetization pinned by the two antiferromagnetic films perpendicular to each other. For achieving the particular situation, antiferromagnetic materials of different types or having controlled compositions differing from each other in the blocking temperature may be used. Even if the antiferromagnetic materials have the blocking temperatures compared with each other, it is possible to control the blocking temperature by making the antiferromagnetic film for the magnetization free layer thicker than the antiferromagnetic film for the magnetization pinned layer.

In FIG. 12B, the magnetization pinned layer 63, provided under insulating layer 65 and upper magnetic shield 67, is formed thicker than the magnetization free layer 1. In this case, the antiferromagnetic film is formed thicker than the magnetization pinned layer in the magnetization pinned layer 63. If the thickness of the antiferromagnetic film is increased sufficiently, it is possible to further elevate the blocking temperature at which the exchange coupling between the antiferromagnetic film and the ferromagnetic film disappears, or it is possible to obtain a greater exchange coupling. This may be interpreted due to the fact that the crystallinity, i.e., (111)-orientation and increase in the crystal grain size, can be controlled by increase in the thickness of the antiferromagnetic film so as to stabilize the magnetization of the antiferromagnetic film.

In the case of the present embodiment, the magnetization pinned layer 63 is annealed first in a magnetic field in a direction perpendicular to the ABS under a temperature T1 and a magnetic field H1, followed by annealing the magnetization free layer 1 in a magnetic field in a direction parallel to the ABS under a temperature T2 (<T1) and a magnetic field H2 (<H1). As a result, the magnetization direction of the magnetization pinned layer 5 is made perpendicular to the magnetization direction of the magnetization free layer 1 under no magnetic field (under the initial state).

Third Embodiment

Figure 13:
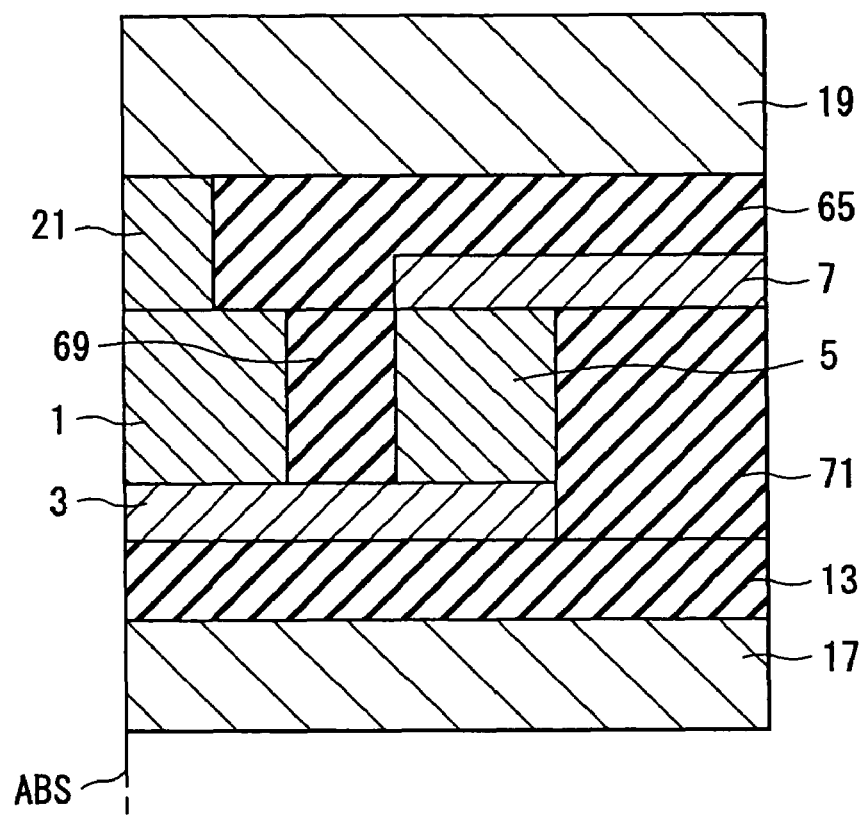
FIG. 13 is a cross-sectional view of a GMR head according to a third embodiment of the present invention in a direction parallel to the track direction.

FIG. 13 is a cross-sectional view showing the construction of the GMR head according to a third embodiment of the present invention. In the present embodiment, the nonmagnetic intermediate layer 3 is formed on the insulating layer 13, and the magnetization free layer 1 and the magnetization pinned layer 5 are formed on the nonmagnetic intermediate layer 3. The magnetization free layer 1 and the magnetization pinned layer 5 are formed apart from each other and are electrically insulated from each other by the insulating film 69. The sense current for detecting the resistance of the GMR element is made to flow through the first electrode 7, the magnetization pinned layer 5, the nonmagnetic intermediate layer 3, the magnetization free layer 1, the pillar electrode 21, and the upper magnetic shield 19.

In the present embodiment, the magnetization free layer 1 and the magnetization pinned layer 5 are connected to the same surface of the nonmagnetic intermediate layer 3. As far as a satisfactory electric connection can be achieved, it is sufficient that the magnetization free layer 1 and the magnetization pinned layer 5 are connected partly to the nonmagnetic intermediate layer 3 and the electrical connection remains insulated by insulating layers 13, 65, and 71.

In the present embodiment, the magnetization free layer 1 and the magnetization pinned layer 5 are connected to the same surface of the nonmagnetic intermediate layer 3. As far as a satisfactory electric connection can be achieved, it is sufficient that the magnetization free layer 1 and the magnetization pinned layer 5 are connected partly to the nonmagnetic intermediate layer 3.

In the construction described above, the nonmagnetic intermediate layer 3 acts as an underlayer for the magnetization free layer 1 and the magnetization pinned layer 5. Where the nonmagnetic intermediate layer 3 acts as the underlayer, it is possible to enhance the (111) crystal orientation of the magnetization free layer 1 and the magnetization pinned layer 5. In general, the orientation can be estimated by observing the full width at half-maximum (FWHM) of the rocking curve of the (111) diffraction peak by X-ray diffractometry.

In the present embodiment, the sense current flows from the pillar electrode 21 through a region of the magnetization free layer 1 in the vicinity of the ABS in a direction perpendicular to the film plane thereof (vertical direction in FIG. 13). Therefore, electrons having spin information are efficiently supplied into the magnetization pinned layer 5 through the nonmagnetic intermediate layer 3.

Also, the interfaces between the nonmagnetic intermediate layer 3 and the magnetization free layer 1 and between the nonmagnetic intermediate layer 3 and the magnetization pinned layer 5 are rendered distinct and, thus, elastic scattering of electrons is anticipated at the interfaces. It follows that a greater MR ratio can be expected.

Fourth Embodiment

Figure 14:
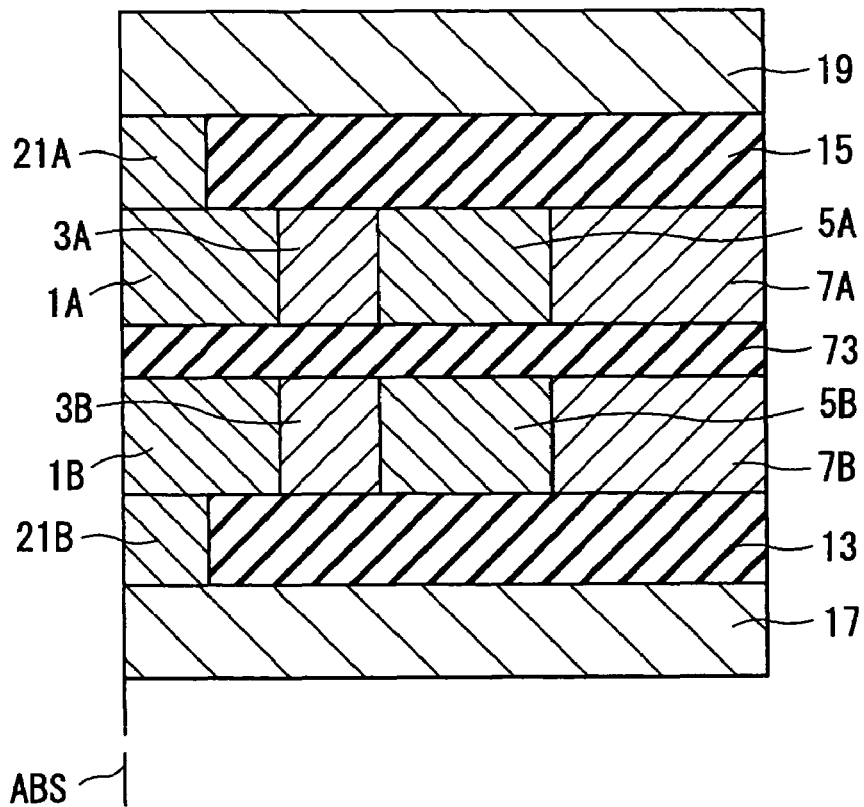
FIG. 14 is a cross-sectional view of a GMR head according to a fourth embodiment of the present invention in a direction parallel to the track direction.

FIG. 14 is a cross-sectional view showing the construction of the GMR head according to a fourth embodiment of the present invention. In the present embodiment, the recording track of the magnetic recording medium to be reproduced extends in the vertical direction in FIG. 14, and the GMR head is moved relative to the magnetic recording medium in the track direction.

The GMR head for this embodiment has a dual structure in which two GMR elements for the first embodiment are sandwiched between the magnetic shields 17 and 19. To be more specific, GMR element (A) and GMR element (B) are formed apart from each other with a third insulating film 73 interposed therebetween.

The GMR element (A) comprises the magnetization free layer 1A, the nonmagnetic intermediate layer 3A, the magnetization pinned layer 5A and the electrode 7A, and the pillar electrode 21A electrically connects the magnetization free layer 1A to the upper magnetic shield 19. The GMR element (B) comprises the magnetization free layer 1B, the nonmagnetic intermediate layer 3B, the magnetization pinned layer 5B and the electrode 7B, and the pillar electrode 21B electrically connects the magnetization free layer 1B to the lower magnetic shield 17.

GMR elements (A) and (B) are formed in symmetry with respect to the third insulating film 73. The effective magnetic gap of GMR element (A) is provided by the pillar electrode 21A between the upper magnetic shield 19 and the magnetization free layer 1A at the ABS and by the insulating film 73 between the magnetization free layer 1A and the magnetization free layer 1B. The effective magnetic gap of GMR element (B) is provided by the insulating film 73 between the magnetization free layer 1B and the magnetization free layer 1A at the ABS and by the pillar electrode 21B between the magnetization free layer 1B and the lower magnetic shield 17. It follows that the effective magnetic gap for two GMR elements can be further narrowed, compared with the case of forming two GMR elements according to other embodiments.

The GMR head described above may be installed in a magnetic recording-reproducing apparatus such as a hard disc drive in a form of a head gimbal assembly. The technology of installing the GMR head in the magnetic recording-reproducing apparatus is known to the art.

Figure 15:
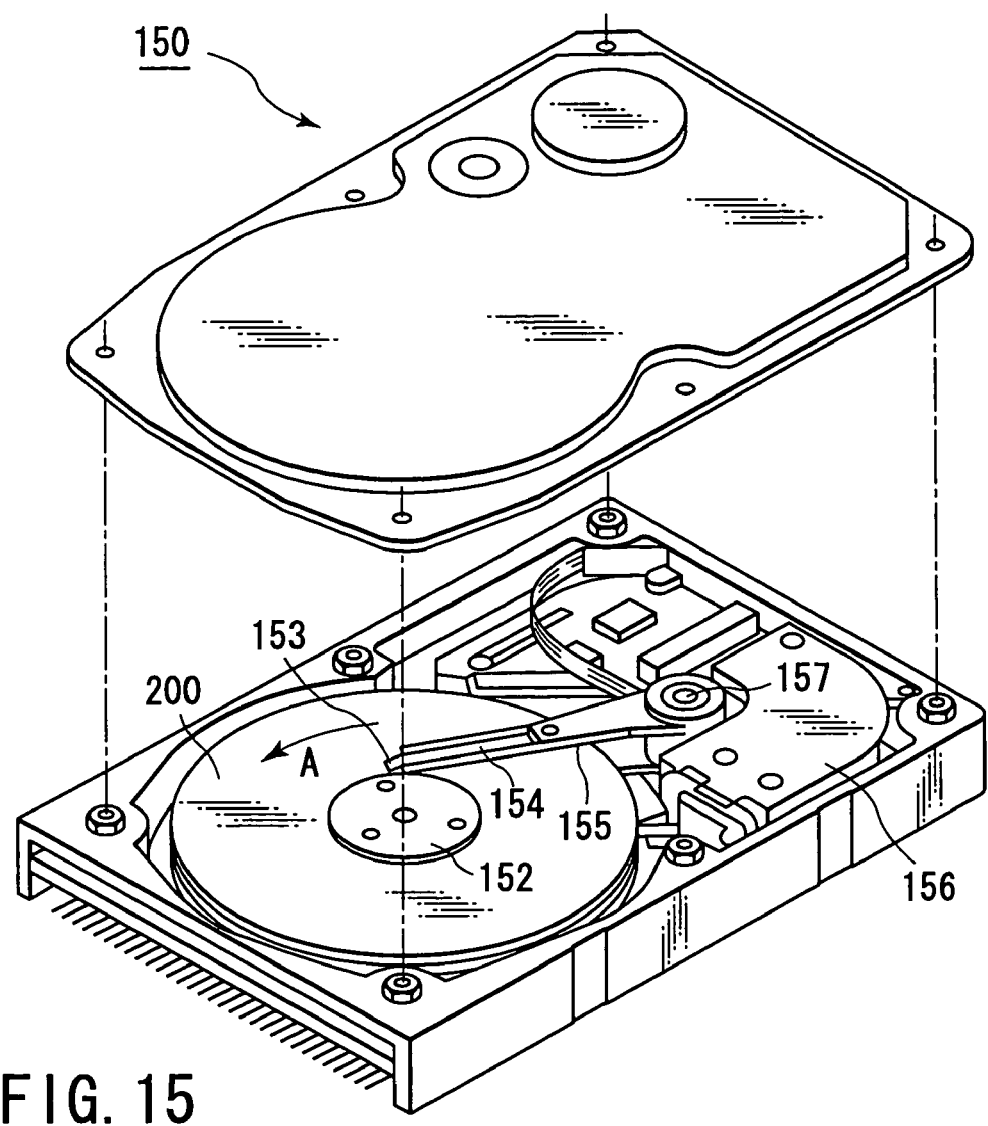
FIG. 15 is a perspective view showing a structure of a magnetic recording-reproducing apparatus according to an embodiment of the present invention.

FIG. 15 is a perspective view schematically showing the structure of a magnetic recording-reproducing apparatus 150. The magnetic recording-reproducing apparatus 150 is of a type using a rotary actuator. As shown in the drawing, a perpendicular magnetic recording disk 151 is fixed to a spindle 152 and is rotated in the direction denoted by an arrow A by a motor (not shown) in response to control signals supplied from a drive controller (not shown). The magnetic recording-reproducing apparatus 150 may be provided with a plurality of disks 151.

A head slider 153 for writing data in and for reading data from the disk 151 is disposed on the tip of a suspension 154. A magnetic head including the magnetoresistive element according to the embodiments of the present invention is formed on the tip portion of the head slider 153. When the disk 151 is rotated, the air-bearing surface (ABS) of the head slider 153 is held floating by a prescribed flying height from the surface of the disk 151. Incidentally, the magnetic recording-reproducing apparatus may be of a contact type that the head slider 153 is in contact with the disk 151.

The suspension 154 is connected to one end of an actuator arm 155 including a bobbin portion for holding a driving coil (not shown) on the other end. A voice coil motor 156, which is one of a linear motor, is arranged on the other end of the actuator arm 155. The voice coil motor 156 comprises a driving coil (not shown) wound onto the bobbin portion of the actuator arm 155 and a permanent magnet and a counter yoke arranged to face each other with the driving coil sandwiched therebetween where these members constitute a magnetic circuit. The actuator arm 155 is held by ball bearings (not shown) arranged at upper and lower portions of a pivot 157 and can be rotated by the voice coil motor 156.

Figure 16:
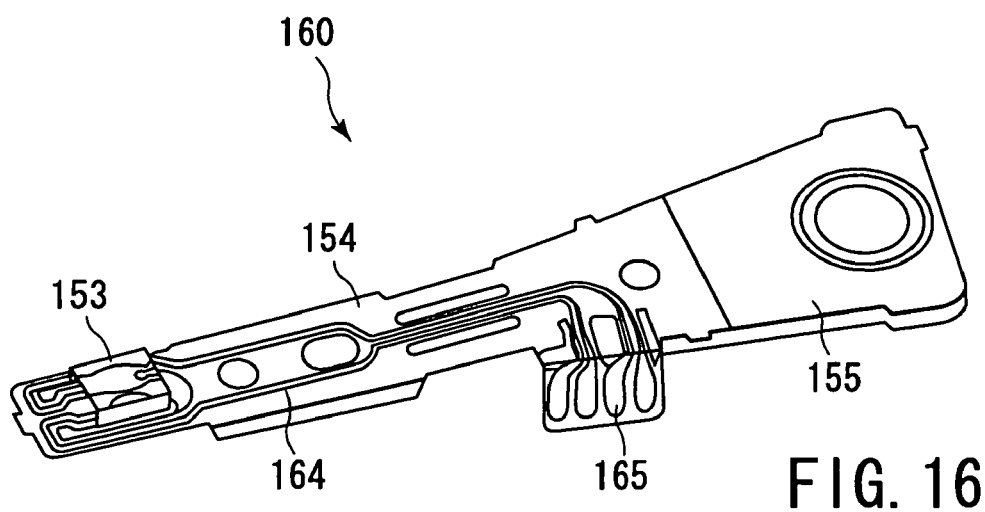
FIG. 16 is a perspective view showing a structure of a magnetic head assembly according to an embodiment of the present invention.

FIG. 16 is a perspective view showing the magnetic head assembly 160 in a magnified fashion, which is viewed from the disk. To be more specific, the magnetic head assembly 160 comprises the actuator arm 155 including a bobbin portion for holding the driving coil, and the suspension 154 is connected to one end of the actuator arm 155. The head slider 153 having the magnetic head including the magnetoresistive element according to the embodiments of the present invention is mounted on the tip of the suspension 154. The suspension 154 includes lead wires 164 for writing and reading signals. The lead wires 164 are electrically connected to each of the electrodes of the magnetic head formed on the head slider 153. A reference numeral 165 shown in the drawing denotes electrode pads of the magnetic head assembly. According to the present invention, it is possible to read without fail the data recorded in the magnetic recording disk 151 even at a recording density markedly higher than that in the prior art by using the magnetic head including the magnetoresistive element described above.

The present invention is not limited to the embodiments described above and can be modified in various fashions within the scope of the present invention defined in the appended claims.

Also, the present invention can be modified in various fashions without deviating the scope of the present invention in actually working the invention.

Further, various inventions can be achieved by employing appropriate combinations of a plurality of constituents disclosed in the embodiments described above. For example, it is possible to omit some constituents of all the constituents disclosed in the embodiments described above. Still further, it is possible to combine appropriately the constituents according to different embodiments.

What is claimed is:

1. A magnetoresistive head, comprising;
    a first magnetic shield;
    a first insulating film formed on the first magnetic shield;
    a magnetoresistive film formed on the first insulating film and comprising a magnetization free layer adjacent to an air-bearing surface, a magnetization pinned layer spaced apart from the magnetization free layer in a head height direction as viewed from the air-bearing surface, and a nonmagnetic intermediate layer connecting the magnetization free layer and the magnetization pinned layer, a magnetization direction of the magnetization free layer being rotatable in an external magnetic field and a magnetization direction of the magnetization pinned layer being substantially pinned under the external magnetic field;
    a second insulating film formed on the first magnetoresistive film, and
    a second magnetic shield formed on the second insulating film.

2. The magnetoresistive head according to claim 1, further comprising an electrode configured to electrically connect one of the first and second magnetic shields to the magnetization free layer.

3. The magnetoresistive head according to claim 2, wherein the electrode is formed of a nonmagnetic material.

4. The magnetoresistive head according to claim 2, wherein a width of the electrode in a track width direction is smaller than a width of the magnetization free layer in the track width direction.

5. The magnetoresistive head according to claim 1, wherein the intermediate layer is sandwiched between the magnetization free layer and the magnetization pinned layer in the height direction as viewed from the air-bearing surface.

6. The magnetoresistive head according to claim 1, wherein an insulating layer is sandwiched between the magnetization free layer and the magnetization pinned layer in the height direction as viewed from the air-bearing surface, and wherein the intermediate layer is formed on the first insulating film, and wherein the magnetization free layer and the magnetization pinned layer are formed on the intermediate layer.

7. The magnetoresistive head according to claim 1, further comprising an under layer and a protective layer, the magnetization free layer being a ferromagnetic layer formed between the under layer and the protective layer.

8. The magnetoresistive head according to claim 1, further comprising an under layer, a biasing layer formed on the under layer, and a protective layer, the magnetization free layer being a ferromagnetic layer formed between the biasing layer and the protective layer, and the protective layer is formed on the ferromagnetic layer.

9. The magnetoresistive head according to claim 1, further comprising an underlayer, a biasing layer, and a protective layer formed on the biasing layer, the magnetization free layer being a ferromagnetic layer formed between the underlayer and the biasing layer.

10. The magnetoresistive head according to claim 1, further comprising an underlayer, an antiferromagnetic layer, and a protective layer formed on the antiferromagnetic layer, the magnetization pinned layer being a ferromagnetic layer formed between the under layer and the antiferromagnetic layer.

11. The magnetoresistive head according to claim 1, further comprising an underlayer, an antiferromagnetic layer formed on the underlayer, and a protective layer, the magnetization pinned layer being a ferromagnetic layer formed between the antiferromagnetic layer and the protective layer.

12. The magnetoresistive head according to claim 1, further comprising an underlayer and a protective layer, the magnetization pinned layer being a hard magnetic layer formed between the under layer and the protective layer.

13. The magnetoresistive head according to claim 1, wherein hard biasing layers are formed on both sides of the magnetization free layer in a track width direction.

14. The magnetoresistive head according to claim 1, wherein the magnetization pinned layer has a thickness larger than that of the magnetization free layer.

15. The magnetoresistive head according to claim 1, wherein the nonmagnetic intermediate layer has a thickness of not more than 2.0 nanometers.

16. A magnetic recording-reproducing apparatus, comprising the magnetoresistive head according to claim 1.

17. A magnetoresistive head, comprising a first magnetic shield, a first insulating film, a first magnetoresistive film, a third insulating film, a second magnetoresistive film, a second insulating film and a second magnetic shield arranged in a track direction, each of the first and second magnetoresistive films comprising: a magnetization free layer formed in a region near an air-bearing surface, a magnetization direction thereof being rotatable with an external magnetic field; a magnetization pinned layer spaced apart from the magnetization free layer in a height direction as viewed from the air-bearing surface, a magnetization direction thereof being substantially pinned under an external magnetic field; and a nonmagnetic intermediate layer connecting the magnetization free layer and the magnetization pinned layer.

18. The magnetoresistive head according to claim 17, further comprising:

an electrode configured to electrically connect the first magnetic shield to the magnetization free layer in the first magnetoresistive film, and another electrode configured to electrically connect the second magnetic shield to the magnetization free layer in the second magnetoresistive film.

* * * * *